United States Patent [19]

Day et al.

[11] Patent Number: 5,008,443

[45] Date of Patent: Apr. 16, 1991

[54] PROCESS FOR THE PREPARATION OF NITRAMINE-CONTAINING HOMOPOLYMERS AND CO-POLYMERS

[75] Inventors: Roger W. Day, Meriden; Rahim Hani, Cheshire, both of Conn.

[73] Assignee: Olin Corporation, Cheshire, Conn.

[21] Appl. No.: 411,380

[22] Filed: Sep. 25, 1989

Related U.S. Application Data

[62] Division of Ser. No. 270,977, Nov. 14, 1988, Pat. No. 4,916,206.

[51] Int. Cl.$^5$ ............................................. C07C 67/08
[52] U.S. Cl. .................................. 560/169; 528/272; 528/291; 562/565
[58] Field of Search ................ 560/169; 528/291, 272

[56] References Cited

U.S. PATENT DOCUMENTS

| | | | |
|---|---|---|---|
| 3,421,955 | 1/1969 | Hauser | 560/169 X |
| 3,472,889 | 10/1969 | Frankel | 558/452 |
| 3,480,490 | 11/1969 | Finger et al. | 149/92 |
| 4,457,791 | 7/1984 | Gill et al. | 149/19.3 |

OTHER PUBLICATIONS

Chi, U.S. Statutory Invention Registration, H365, Nov. 3, 1987, 3 pages.

*Primary Examiner*—Jose G. Dees
*Assistant Examiner*—Vera C. Clarke
*Attorney, Agent, or Firm*—Dale Lynn Carlson

[57] ABSTRACT

Energetic binders, and, more specifically, a class of nitramine-containing homopolymers and co-polymers characterized by favorable viscosity and glass transition temperature are prepared.

6 Claims, No Drawings

PROCESS FOR THE PREPARATION OF NITRAMINE-CONTAINING HOMOPOLYMERS AND CO-POLYMERS

This application is a division of application Ser. No. 270,977 filed Nov. 14, 1988, now U.S. Pat. No. 4,916,206.

FIELD OF THE INVENTION

This invention relates generally to energetic binders, and, more specifically, to a class of nitramine-containing homopolymers and co-polymers characterized by favorable viscosity and glass transition temperature.

BACKGROUND OF THE INVENTION

Certain energetic binders which are useful in propellants and explosives formulations are known in the art. By way of illustration, a compound called GAP (glycidyl azide polymer) is known to provide energy and function as a binder when formulated in propellants and explosives used in various applications. However, materials such as GAP are very expensive, costing up to $100 per pound and are known to release gases during storage and/or prior to or during processing. In addition, toxic and explosive ingredients are required to produce this polymer. Therefore, alternate high energy binders that are less expensive and safer to produce and still afford a good combination of desirable characteristics, such as a high impetus, a low glass transition temperature, and a low viscosity, would be highly desired by the propellant and explosives community.

Various nitropolymers have been fabricated in the past for application in solid, smokeless propellants. For example, Aerojet General published a report, Report No. 1162, dated Sept. 28, 1956, entitled "Research in Nitropolymers and Their Application to Solid Smokeless Propellants". This report documents various polymerization reactions useful in making nitropolymers, including various esters of nitramino diacids. These polymers, however, generally have a higher molecular weight than might be desired and do not possess carefully controlled, reactive, functional end groups as would be desirable.

Hercules Incorporated investigated a specific nitramine-containing polymer, poly(diethylene glycol-4,7-nitrazadecanedioate) designated as P-DEND. In a report entitled "High Performance Minimum Smoke Propellants", Technical Report CR-RD-PR-86-4, dated May, 1986. Hercules documents work performed for the U.S. Army Missile Command wherein P-DEND is described as being a feasible ingredient for use in nitrate ester-plasticide propellants. This report states that attempts to fabricate P-DEND by an acid catalyzed esterification reaction of 4,7-dinitrazadecanedioic acid (DNDA) with diethylene glycol in a variety of organic solvents were unsuccessful. This failure is attributed in the report to the fact that a cyclization reaction rather than a polymerization reaction occurred. More recently, the present inventors have found that P-DEND has a viscosity and a glass transition temperature that are higher than might be desired.

New polymer binders exhibiting excellent impetus and characterized by an advantageous viscosity and glass transition temperature would be highly desirable to the propellants and explosives community.

SUMMARY OF THE INVENTION

In one aspect, the present invention relates to novel nitramine-containing polymers characterized by an advantageous combination of a low viscosity and a low glass transition temperature. The novel polymers are characterized by the following empirical structural formula:

$[(OOCCH_2CH_2-R-CH_2CH_2CO)_x(OOCCH_2CH_2-R'-CH_2CH_2CO)_y(OR'')]_n$ wherein R and R' are the same or different moieties selected from the group consisting of $-N(NO_2)-$, $-N(NO_2)CH_2CH_2N(NO_2)-$, and $-N(NO_2)ZN(NO_2)-$, wherein Z is a linear or branched-chain hydrocarbon having between 3 and 10 carbon atoms, with the proviso that at least one R or R' moiety on average per molecule of said polymer must be other than $-N(NO_2)CH_2CH_2N(NO_2)-$, and wherein x represents a mole fraction having a value between 0 and 1, y represents a mole fraction equal to 1 minus x and having a value between 0 and 1, R'' is a linear or branched chain alkylene or alkylene ether radical having between 2 and 12 (preferably between 2 and 6) carbon atoms and having primary or secondary carbon atoms at said radical's points of attachment in said polymer, and n has a value between 2 and 50 (preferably between 2 and 20).

In another aspect, the present invention relates to a process for producing a nitramine-containing polymer which comprises the steps of reacting a nitramine-containing dicarboxylic acid monomer with a diol monomer in the presence of an acid catalyst by a melt polymerization reaction to form said nitramine-containing polymer while removing by-product water during the course of said reaction.

After the reaction has begun and particularly during the later stage of the reaction, it is preferred that water be removed by vacuum distillation or as the azeotropic reaction progress in order to expedite formation of the desired nitramine-containing polymer product. In addition, it is preferred that the polymer product be purified in a purification step, suitably by precipitation in a solvent/non-solvent mixture or by using gel permeation chromatography. If desired, the nitramine-containing polymer is end-capped with a functional moiety to impart a desired terminal functionality to the polymer. In the absence of such end-capping, the polymer is generally carboxyl- or hydroxyl-terminated.

DETAILED DESCRIPTION OF THE INVENTION

The polymers described in this invention are any of a variety described by the general empirical formula given above. The polymers are prepared by reacting a nitramine-containing (i.e. nitraza-containing) dicarboxylic acid with a diol in the presence of an acid catalyst under melt polymerization (esterification) reaction conditions (i.e. In the absence of a solvent).

The monomers useful in the present invention include the following diacid (dicarboxylic) monomers: 4,7-dinitraza-1,10-decanedioic acid (DNDA); 5-methyl-4,7-dinitraza-1,10-decanedioic acid (MDNDA); 4-nitraza-1,7-heptanedioic acid (NHDA); 4,8-dinitraza-1,11-undecanedioic acid (DNUDA), and other diacids of similar structure. Useful diol monomers include a wide variety of diols, such as, for example, ethylene glycol, propylene glycol, 1,4-butane diol, 1,6-hexane diol, diethylene glycol and various other diols of similar structure.

The homopolymers identified in Table 1 below as Polymer 5 and Polymer 8 are preferred due to their relatively low glass transition temperature which provides superior performance in formulated products, such as propellants or explosives. In addition, these two polymers were found to have relatively low viscosities which gives superior performance during processing of the formulated propellant or explosive product. Other preferred polymers are those identified as Polymers 7, 9, 10, and 11 in Table 1 below. These co-polymers also possess relatively low viscosity and glass transition temperatures. It is preferred that the amount of the more rigid diacid monomer 4,7-dinitraza-1,10-decanedioic acid, be kept fairly low relative to the diol monomer used to fabricate these co-polymers, as is illustrated by the fabrication of Polymers 7 and 11.

It has been found, by virtue of the synthesis and characterization of various polymer structures leading up to the present invention, that certain polymer structures provide products having lower glass transition temperatures (See Table 1 below) and lower viscosities than those provided by prior art polymers. Specifically, Polymers 5 and 8 have lower $T_g$'s and lower viscosities than the other homopolymer materials fabricated, including the prior art polymer P-DEND (Polymer 1). It is believed that these results are due to certain structural characteristics of the polymer molecule. Polymer 1 has two methylene groups between the nearest neighboring nitraza groups and exhibits a high glass transition temperature (0° C.) and a high viscosity. Although not wishing to be bound by any particular theory, the present inventors speculate that this result is due to a steric hinderance or polar interaction between the nitraza groups which inhibits rotation within the molecule about the molecular axis. Such interaction leads to higher glass transition temperatures and viscosities. Note that Polymer 2 has a methyl group attached to one of the two methylene groups between the nitraza groups. The fact that Polymer 2 has been found by the present inventors to have a glass transition temperature even higher than that of Polymer 1 supports the above-discussed steric hinderance theory.

The present inventors theorize that the larger spacing between the sterically bulky and polarized nitraza groups, such as the three methylene groups in Polymer 8, provides a resulting polymer having a lower glass transition temperature and lower viscosity. The glass transition temperature as indicated in Table 1 for Polymer 8 is much lower than that for Polymer 1 or Polymer 2.

Although exact viscosity measurements for these polymers has not been made due to sample size limitations, empirical measurements indicate Polymer 8 is less viscous than Polymer 1. This may due in part to the molecular weight differences between the two polymers, but even when a variety of higher molecular weight (as indicated by GPC) samples of Polymer 8 were prepared, the viscosity was found to be significantly lower than that of Polymer 1.

The glass transition temperature (See Table 1 below) and the viscosity of Polymer 5 are also much lower than those of Polymers 1 and 2. As was the case for Polymer 8, it is believed that this, again, is due to a lack of steric or polar interaction along the polymer backbone. Since Polymer 5 has an isolated nitraza group in its structure, the types of interactions along the molecular axis that result in hindered rotation should not occur.

As can be seen from Table 1, various co-polymers can be prepared by using a blend of two or more diacids. Polymers 7 and 11 were prepared using 30 percent 4,7-dinitraza-1,10-decanedioic acid ("DNDA") which has a slightly higher energy content on a weight basis than the diacid monomers used for the preparation of Polymers 5 and 8, but, as mentioned above, provides higher Tg's and viscosities for the resulting co-polymers than were obtained for the homopolymers. Fortunately, the glass transition temperatures for the resulting co-polymers prepared using a 30 percent DNDA level are acceptable. Moreover, the DNDA provides enhanced calculated energy content for the polymer. Polymer 6 which contains 70 percent 4,7-dinitraza-1,10-decanedioic acid, does show a higher Tg than Polymer 5. Thus, if a large amount of 4,7-dinitraza-1,10-decanedioic acid is used as monomer, the properties of the binder tend to have less desirable characteristics analogous to those of homopolymers of 4,7-dinitraza-1,10-decanedioic acid (P-DEND).

The polymers and co-polymers of the present invention combine the advantages cited above with high calculated (by the Naval Weapons Center PEP method) impetus in propellant formulations, a desired fuctionality of very near two, primarily hydroxyl termination (if desired) of the polymer chains, and a molecular weight which can readily be controlled to any desired value. The preferred polymer molecular weight is between about 500 and about 10,000.

Note that the molecular weight of the polymers can be controlled by varying the stoichiometry of the diol and diacid monomers. Typically, the polymers are prepared using an excess of the diol monomer relative to the diacid, thereby providing a hydroxy-terminated polymer. Alternately, the polymer may be terminated by carboxyl groups by the simple technique of adjusting the stoichiometric ratio of monomers such that the diacid (i.e. the dicarboxylic acid monomer) is present in excess relative to the diol monomer. As another alternative, other functional moieties can be used to end-cap the polymer molecules to impart a desired terminal functionality to the polymer. For example, the hydroxy-terminated polymer can be reacted with an excess of diisocyanate to yield an isocyanate-terminated polymer. Alternately, a diacid chloride such as adipoyl chloride, phosgene, or other similar compounds can be reacted with the hydroxy-terminated polymer to give polymers terminated with acid chloride or chloroformate groups. In similar ways, the carboxyl end groups of the carboxy-terminated polymer can be chemically modified to yield any of a variety of functional groups as terminal groups for these polymers. This flexibility in designing the end group or terminal group on the polymer molecule is important because it allows a great range of possibilities in terms of the curing of these materials with other components to fabricate the desired final product, namely the propellant or explosive product.

The reaction time useful for the process of the present invention is not narrowly critical and can vary over a wide range. It is preferred that the reaction time be between about 2 and about 8 hours, more preferably between about 3 and about 5 hours.

Likewise, the reaction temperature is not narrowly critical and can vary over a wide range. Preferably the reaction temperature is between about 60° C. and about 150° C., more preferably between about 95° C. and about 125°, and most preferably between about 105° C. and about 115° C.

The process of the present invention is conducted in the presence of an acid catalyst. Suitable acid catalysts include the following: p-toluene sulfonic acid, sulfuric acid, zinc acetate, cadmium acetate, and any other acid catalyst suitable for esterification reactions. The yield, molecular weight, polymer properties, and process variables will differ depending upon the catalyst employed.

The reaction in accordance with the present invention is preferably suitably conducted, for the most part, at subatmospheric pressure, most preferably at a pressure of between about 0.001 mm of Hg and about 600 mm of Hg. The subatmospheric pressure makes it possible for easy removal of the water by-product from the reaction mixture, thereby driving the polycondensation reaction to completion as desired. Because of the volatility of some of the monomers employed, however, subatmospheric pressure is preferably not applied during the initial stage of the reaction. Alternative or additional methods can be used to remove by-product water from the reaction mixture such as azeotropic distillation, chemical drying, or the like.

The optional polymer purification step, if utilized, is preferably conducted by precipitation in a mixture of a paired solvent/non-solvent. Suitable solvent/non-solvent pairs can be chosen from the following solvents: methylene chloride, chloroform, tetrahydrofuran, or any other organic solvent capable of dissolving the polymers; and the following non-solvents: methanol, ethanol, water, hexane, cyclohexane, benzene or any other organic medium which is not a solvent for polymers. Alternately, other purification methods can be employed such as gel permeation chromatography.

The polymers produced in accordance with the process of the present invention generally have a weight average molecular weight of between about 500 and about 10,000, preferably between about 1000 and about 5000. The glass transition temperature of the polymer ($T_g$) is generally less than 0° C., preferably less than $-10°$ C., and more preferably less than $-15°$ C. The viscosity of the polymer is generally less than 50,000 centipoise, preferably less than 20,000 centipoise, and more preferably less than 10,000 centipoise.

As used herein, the term "percent" designates weight percent and the term "fraction" designates mole fraction unless otherwise specified.

The aforementioned technical publications are incorporated herein by reference in their entirety.

The following examples are intended to illustrate, but in no way limit the scope of, the present invention.

EXAMPLE 1

Novel Process for Synthesizinq Poly(Diethylene Glycol-4,7-Dinitraza-1,10-Decanedioate) (Also Called "P-DEND") See Polymer 1 of Table 1 Below A 5 ml one-neck flask equipped with a magnetic stirring bar and a nitrogen adaptor was charged with 1.00 g (4.18 mmol) of 4,7-dinitraza-1,10-decanedioic acid (DNDA), 0.44 g (4.19 mmol) of diethylene glycol and 3 mg of p-toluene sulfonic acid. The mixture was heated to 100° C. and stirring started when the mixture melted. The mixture was heated for 5 hours and then vacuum was applied for a period of 1.5 hours at 100° C. Then the mixture was cooled to room temperature and dissolved in 3 ml of methylene chloride. The polymer was precipitated by pouring the methylene chloride solution into 40 ml of methanol. The methanol was decanted and the tacky polymer dried in a vacuum oven at 60° C. overnight. The yield of the Polymer 1 product was 0.88 g (69%) based on diacid used. The physical data is given in Table 1. Polymer 1 is a comparison composition (P-DEND) for purposes of the present invention; however, its preparation as described above is believed to be novel.

EXAMPLE 2

Synthesis of Polymer 2 Identified in Table 1

Polymer 2 was prepared by the same method as described for 1 by using 1.54 g (5 mmol) of 5-methyl-4,7-dinitraza-1,10-decanedioic acid (MDNDA), 0.53 g (5 mmol) of diethylene glycol and 3 mg of p-toluene sulfonic acid. The yield 1.45 g (77%) based on diacid used. The physical data is given in Table 1.

EXAMPLE 3

Synthesis of Polymer 3 Identified in Table 1

Polymer 3 was prepared by the same method as described for 1 by using 0.27 g (0.88 mmol) of 5-methyl-4,7-dinitraza-1,10-decanedioic acid (MDNDA), 0.600 g (2.04 mmol) of 4,7-dinitraza-1,10-decanedioic acid (DNDA), 0.41 g (3.95 mmol) of diethylene glycol and 2 mg of p-toluene sulfonic acid. The yield 0.8 g (69%) based on diacids used. The physical data is given in Table 1.

EXAMPLE 4

Synthesis of Polymer 4 Identified in Table 1

Polymer 4 was prepared by the same method as described for 1 by using 1.08 g (3.5 mmol) of 5-methyl-4,7-dinitraza-1,10-decanedioic acid (MDNDA), 0.44 g (1.5 mol) of 4,7-dinitraza-1,10-decanedioic acid (DNDA), 0.5311 g (5 mmol) of diethylene glycol and 2 mg of p-toluene sulfonic acid. The yield is 1.46 g (78%) based on diacids used. The physical data is given in Table 1.

EXAMPLE 5

Synthesis of Polymer 5 Identified in Table 1

Polymer 5 was prepared by the same method as described for 1 by using 1.80 g (8.73 mmol) of 4-nitraza-1,7-heptanedioic acid (NHDA), 1.04 g (9.81 mmol) of diethylene glycol and 5 mg of p-toluene sulfonic acid. The yield was 2.44 g (96%) based on diacid used by precipitating the polymer in hexane. The physical data is given in Table 1.

EXAMPLE 6

Synthesis of Polymer 6 Identified in Table 1

Polymer 6 was prepared by the same method as 1 by using 1.47 g (5 mmol) of 4,7-dinitraza-1,10-decanedioic acid (DNDA), 0.44 g (2.13 mmol) of 4-nitraza-1,7-heptanedioic acid (NHDA), 0.85 g (8.02 mmol) of diethylene glycol and 5 mg of p-toluene sulfonic acid. The yield was 2.08 g (96%) based on diacid used. The physical data is given in Table 1.

EXAMPLE 7

Synthesis of Polymer 7 Identified in Table 1

Polymer 7 was prepared by the same method as 1 by using 0.76 g (2.57 mmol) of 4,7-dinitraza-1,10-decanedioic acid (DNDA), 1.24 g (6 mmol) of 4-nitraza-1,7-heptanedioic acid (NHDA), 1.02 g (9.63 mmol) of diethylene glycol and 5 mg of p-toluene sulfonic acid. The yield was 2.18 g (95%) based on diacid used. The physical data is given in Table 1.

EXAMPLE 8

Synthesis of Polymer 8 Identified in Table 1

Polymer 8 was prepared by the same method as 1 by using 1.85 g (6 mmol) of 4,8-dinitraza-1,11-undecanedioic acid (DNUDA) 0.72 g (6.74 mmol) of diethylene glycol and 5 mg of p-toluenesulfonic acid. The yield was 1.92 g (93%) based on diacid used. The physical data is given in Table 1.

EXAMPLE 9

Synthesis of Polymer 9 Identified in Table 1

Polymer 9 was prepared by the same method as 1 by using 1.23 g (4 mmol) of 4,8-dinitrazaundecanedioic acid (DNUDA), 0.35 g (1.71 mmol) of 4-nitraza-1,7-heptanedioic acid (NHDA), 0.68 g (6.41 mmol) of diethylene glycol and 4 mg of p-toluene sulfonic acid. The yield was 1.47 g (82%) based on diacids used. The physical data is given in Table 1.

EXAMPLE 10

Synthesis of Polymer 10 Identified in Table 1

Polymer 10 was prepared by the same method as 1 by using 0.62 g (2 mmol) of 4,8-dinitraza-1,11-undecanedioic acid (DNUDA), 0.96 g (4.67 mmol) of 4-nitraza-1,7-heptanedioic acid (NHDA), 0.80 g (7.49 mmol) of diethylene glycol and 5 mg of p-toluene sulfonic acid. The yield was 1.3 g (63%) based on diacids used. The physical data is given in Table 1.

EXAMPLE 11

Synthesis of Polymer 11 Identified in Table 1

Polymer 11 was prepared by the same method as 1 by using 1.08 g (3.5 mmol) of 4,8-dinitraza-1,11-undecanedioic acid (DNUDA), 0.44 g (1.5 mmol) of 4,7-dinitraza-1,10-decanedioic acid (DNDA), 0.60 g (5.62 mmol) of diethylene glycol and 5 mg of p-toluene sulfonic acid. The yield was 1.60 g (95%) based on diacids used. The physical data is given in Table 1.

EXAMPLE 12

Synthesis of Polymer 12 Identified in Table 1

Polymer 12 was prepared by the same method as 1 by using 1.54 g (5 mmol) of 4,8-dinitraza-1,11-undecanedioic acid (DNUDA), 0.36 g (5.88 mmol) of ethylene glycol, and 5 mg of p-toluenesulfonic acid. The yield 1.42 g (85%) based on diacids used. The physical data is given in Table 1.

TABLE I

POLYMER PREPARATION DATA

| | MOLAR PERCENTS OF MONOMERS USED | | | | PHYSICAL PROPERTIES OF THE POLYMER | | |
|---|---|---|---|---|---|---|---|
| Polymer* | DNDA [a] % | MDNDA [b] % | NHDA [c] % | DNUDA [d] % | MW [e] | $T_g$ [f] (°C.) | Decomposition (°C.) |
| 1 | 100 | — | — | — | 4253 | 0 | 222.0 |
| 2 | — | 100 | — | — | 1907 | 0.75 | 243.2 |
| 3 | 70 | 30 | — | — | 3664 | −6.5 | — |
| 4 | 30 | 70 | — | — | 1912 | — | — |
| 5 | — | — | 100 | — | 2511 | −19.1 | 228.0 |
| 6 | 70 | — | 30 | — | 4775 | −9.5 | 261.4 |
| 7 | 30 | — | 70 | — | 2525 | −20.5 | 255.0 |
| 8 | — | — | — | 100 | 2932 | −22 | 256.0 |
| 9 | — | — | 30 | 70 | 2217 | −22 | 258.2 |
| 10 | — | — | 70 | 30 | 2026 | −15 | 261.0 |
| 11 | 30 | — | — | 70 | 2880 | −20 | 255.6 |
| 12 | — | — | — | 100 | 2418 | — | — |

[a] 4,7-dinitraza-1,10-decanedioic acid (DNDA).
[b] 5-methyl-4,7-dinitraza-1,10-decanedioic acid (MDNDA).
[c] 4-nitraza-1,7-heptanedioic acid (NHDA).
[d] 4,8-dinitraza-1,11-undecanedioic acid (DNUDA).
[e] Weight average molecular weight.
[f] Glass transition temperature of the polymer.

*In Table 1, the various numbered polymers are more specifically identified by the empirical structure formula as follows:
$[(OOCCH_2CH_2—R—CH_2CH_2CO)_x(OOCCH_2CH_2—R'—CH_2CH_2CO)_y(OR'')]_n$
wherein n had a value of between 3 and 10, and wherein:

| | R | R' | x | y | R'' |
|---|---|---|---|---|---|
| 1. | —N(NO_2)CH_2CH_2N(NO_2)— | — | 1 | 0 | —CH_2CH_2OCH_2CH_2— |
| 2. | —N(NO_2)CH_2CHN(NO_2)—<br>                 \|<br>                CH_3 | — | 1 | 0 | —CH_2CH_2OCH_2CH_2— |
| 3. | —N(NO_2)CH_2CH_2N(NO_2)— | —N(NO_2)CH_2CHN(NO_2)—<br>                 \|<br>                CH_3 | 0.7 | 0.3 | —CH_2CH_2OCH_2CH_2— |
| 4. | —N(NO_2)CH_2CH_2N(NO_2)— | —N(NO_2)CH_2CHN(NO_2)—<br>                 \|<br>                CH_3 | 0.3 | 0.7 | —CH_2CH_2OCH_2CH_2— |
| 5. | —N(NO_2)— | — | 1 | 0 | —CH_2CH_2OCH_2CH_2— |
| 6. | —N(NO_2)CH_2CH_2N(NO_2)— | —N(NO_2)— | 0.7 | 0.3 | —CH_2CH_2OCH_2CH_2— |
| 7. | —N(NO_2)CH_2CH_2N(NO_2)— | —N(NO_2)— | 0.3 | 0.7 | —CH_2CH_2OCH_2CH_2— |

TABLE I-continued

| POLYMER PREPARATION DATA | | | | |
|---|---|---|---|---|
| 8. —N(NO$_2$)CH$_2$CH$_2$CH$_2$N(NO$_2$)— | — | 1 | 0 | —CH$_2$CH$_2$OCH$_2$CH$_2$— |
| 9. —N(NO$_2$)CH$_2$CH$_2$CH$_2$N(NO$_2$)— | —N(NO$_2$)— | 0.3 | 0.7 | —CH$_2$CH$_2$OCH$_2$CH$_2$— |
| 10. —N(NO$_2$)CH$_2$CH$_2$CH$_2$N(NO$_2$)— | —N(NO$_2$)— | 0.7 | 0.3 | —CH$_2$CH$_2$OCH$_2$CH$_2$— |
| 11. —N(NO$_2$)CH$_2$CH$_2$N(NO$_2$)— | —N(NO$_2$)CH$_2$CH$_2$CH$_2$N(NO$_2$)— | 0.3 | 0.7 | —CH$_2$CH$_2$OCH$_2$CH$_2$— |
| 12. —N(NO$_2$)OH$_2$CH$_2$CH$_2$CH$_2$N(NO$_2$)— | — | 1 | 0 | —CH$_2$CH$_2$— |

What is claimed is:

1. A process for producing a nitramine-containing polymer which comprises the steps of:
   (a) reacting a nitramine-containing dicarboxylic acid monomer selected from the group consisting of 4,7-dinitraza-1,10-decanedioic acid (DNDA); 5-methyl-4,7-dinitraza-1,10-decanedioic acid (MDNDA); 4-nitraza-1,7-heptanedioic acid (NHDA); 4,8-dinitraza-1,11-undecanedioic acid (DNUDA), and combinations thereof, with a diol monomer selected from the group consisting of ethylene glycol, propylene glycol, 1,4-butane diol, 1,6-hexane diol, diethylene glycol and combinations thereof, in the presence of an acid catalyst by a melt polymerization reaction, the molar ratio of said diol monomer being either equimolar or a molar excess of said diol monomer relative to said nitramine-containing dicarboxylic acid monomer, said reaction being effected at a reaction temperature of between about 60° C. and about 150° C. and a reaction pressure which is either atmospheric or subatmospheric ranging between about 0.001 mm of Hg and about 600 mm. of Hg., to form said nitramine-containing polymer, and
   (b) removing by-product water during the course of the reaction.

2. The process of claim 1 wherein said by-product water is removed by distillation thereof.

3. The process of claim 1 wherein by-product water is removed during the course of said reaction by vacuum distillation with the proviso that a vacuum is applied only after any volatile monomer reactants have reacted.

4. The process of claim 1 including the further step of purifying the said polymer by precipitation using a paired solvent/non-solvent mixture.

5. The process of claim 4 wherein the solvent is selected from the group consisting of methylene chloride, chloroform, tetrahydrofuran, and mixtures thereof.

6. The process of claim 4 wherein the non-solvent is selected from the group consisting of water, methanol, ethanol, hexane, cyclohexane, benzene, and mixtures thereof.

* * * * *